Patented Sept. 15, 1942

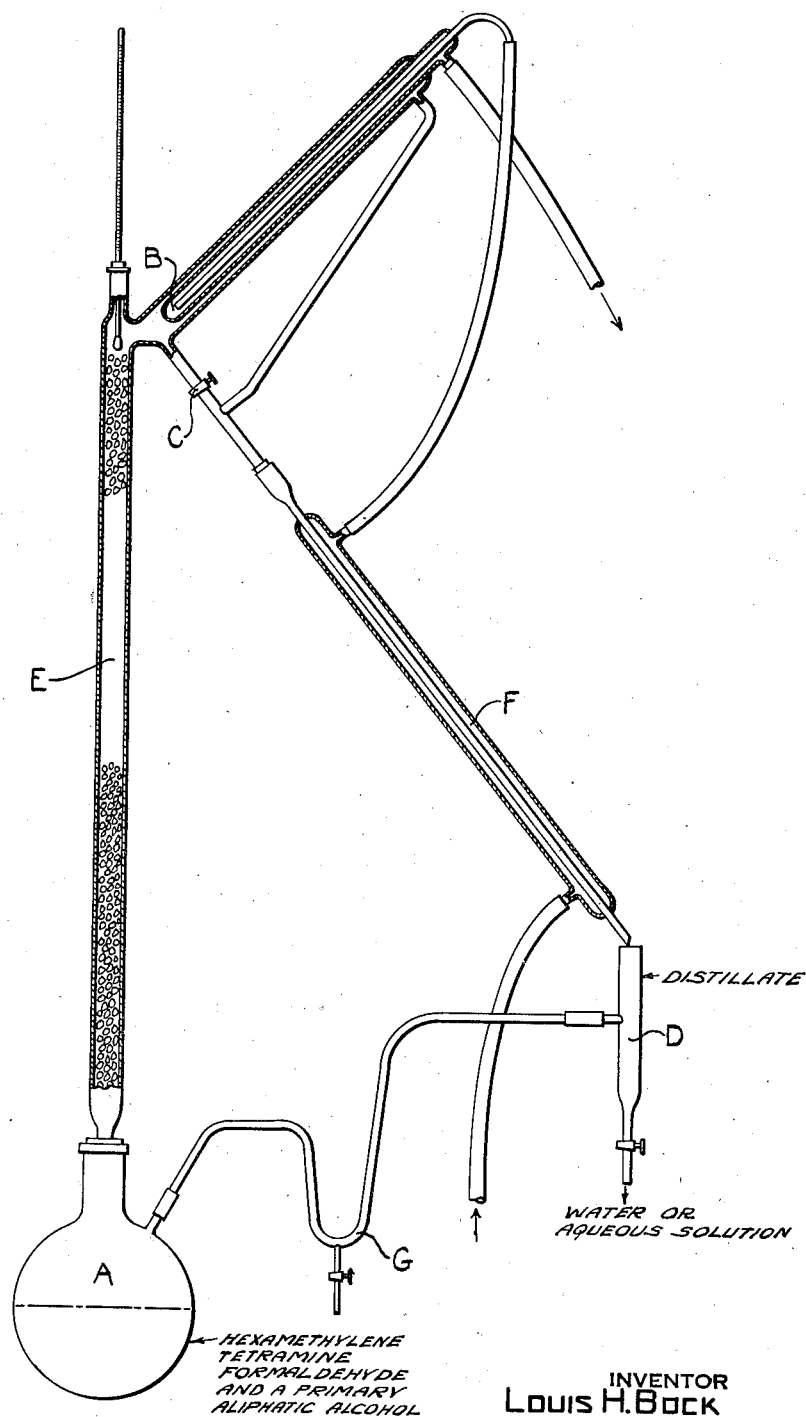

2,295,709

UNITED STATES PATENT OFFICE 2,295,709

ALPHYLOXYMETHYL AMINES

Louis H. Bock, Glenside, Pa., assignor to Röhm & Haas Company, Philadelphia, Pa.

Application July 16, 1940, Serial No. 345,775

10 Claims. (Cl. 260—584)

This invention relates to amines having the formula $(ROCH_2)_3N$ wherein R is a primary aliphatic group, and to a method for the preparation of these amines.

It has been found that hexamethylene tetramine, anhydrous formaldehyde, and primary aliphatic alcohols react to give tertiary amines corresponding to the above formula.

To supply anhydrous formaldehyde there may be used gaseous formaldehyde, or formaldehyde dissolved in an organic liquid, including the primary alcohol which may be used as a reactant, or a solid polymer of formaldehyde. These polymers comprise trioxymethylene and other polyoxymethylenes; they are commercially available as paraformaldehyde; and, when heated, they supply formaldehyde.

The alcohol used as a reactant may be of any primary aliphatic alcohol, such as methyl, ethyl, propyl, isopropyl, butyl, allyl, methallyl, octyl, undecenyl, dodecyl, cetyl, or similar aliphatic alcohol, or an ether alcohol, that is, an alcohol, the aliphatic chain of which is interrupted by oxygen, such as ethoxyethyl, butoxyethyl, methoxypropyl, ethoxyethoxyethyl, phenoxyethyl, butylphenoxyethyl, octylphenoxyethyl, phenoxyethoxyethyl, etc. alcohol. Any or all of the above alcohols are included in the term "aliphatic alcohols."

In preparing the amines of this invention hexamethylene tetramine, anhydrous formaldehyde, and a primary alcohol are mixed. If desired, an organic solvent, such as benzene or toluene, may be added. The mixture is heated until water is no longer evolved. The reaction begins even below 50° C. in many cases but is accelerated with increasing temperatures. A practical upper temperature limit results from the tendency of formaldehyde to escape. This may be overcome by conducting the reaction in a closed system and under pressure. This difficulty is not serious, however, up to and including the boiling range of butyl alcohol.

In the reaction of the three components water is formed which it is necessary to remove in order to obtain a satisfactory yield of the desired amine. This may be accomplished in a number of ways. For instance, the water may be taken up by absorbents, such as calcium sulfate. In other cases water may be removed by the distillation of the alcohol, by distillation of solvent, or by the combined distillation of alcohol and solvent as in an azeotropic mixture. In some cases water can be satisfactorily separated by refluxing of liquids which are not miscible with water and trapping of condensed water with return of organic liquid. When so desired, organic solvents taken off by distillation or refluxing may be dried by conventional absorbents, such as sodium, magnesium, or calcium sulfates, and then returned to the reaction vessel.

When the reaction is essentially complete, excess alcohol, if present and volatile, or solvent, if used, may be distilled from the reaction vessel, leaving a residue which consists chiefly of the desired amine. This may be further purified by such methods as extraction or, in many cases, by distillation, particularly under reduced pressure.

A particularly suitable and convenient method of conducting the reaction is available through the use of an apparatus such as shown diagrammatically in the accompanying drawing. The apparatus comprises a reaction vessel A attached to a packed distilling column E. At the head of this column is located a water-cooled condenser B. It is usually desirable that a thermometer also be located at the head of the column. A tube from B leads through the control valve or stop-cock C and through a second condenser F into a receiver D. The receiver D is connected at a mid-point to the reaction vessel through a trap G, which is fitted with a valve or stop-cock.

In preparing the amines in this apparatus the mixture of reactants, with or without added solvent, is placed in vessel A and heated. In a short time alcohol or solvent begins to condense in B. This distillate is taken off by opening valve C and by means of this valve the reflux ratio is adjusted to give the maximum removal of water. The distillate is collected in receiver D. When the organic liquid used is immiscible with water, water collects in the bottom of D and may be drawn off as desired while organic solvent is returned through G to the vessel A. If desired, a drying tower with an absorbent may be placed between D and A to remove the last traces of moisture from the returning organic liquid.

The preparation of the amines of this invention with the aid of this apparatus is illustrated in the following examples.

Example 1

A mixture of 300 parts of butanol, 23.5 parts of hexamethylene tetramine, and 30 parts of paraformaldehyde was placed in the reaction vessel of an apparatus like that shown in the diagram.

The mixture was heated and the vapors at the head of the distilling column totally condensed and returned until equilibrium conditions were attained. The temperature at the head of the column was 92° C. at this point. The valve, corresponding to C in the diagram, was then partially opened and condensate collected in the receiver D. Water settled at the bottom of the receiver and butyl alcohol was then returned to the reaction vessel through G. After a short time a nine parts of aqueous layer was collected. An additional nine parts of water was present in the butanol saturated with water which collected in the receiver. This was drawn off and distillation of butyl alcohol from the reaction vessel was continued without return of alcohol through G.

After all the butyl alcohol was distilled from the reaction vessel, the residue was placed in a vacuum still and distilled under reduced pressure. The bulk of the material distilled between 150° and 157° C. under 7 mm. pressure, giving a yield of 121.5 parts of product, which was found to be essentially $(C_4H_9OCH_2)_3N$.

Example 2

A mixture of 46.5 parts of hexamethylene tetramine, 60 parts of paraformaldehyde, 250 parts of absolute ethyl alcohol, and 200 parts of dry benzene was heated in an apparatus of the type illustrated. When vapor at the head of the distilling column (at about 65° C.) was condensing at a constant rate, the valve C was opened partly and condensate collected in the receiver in two liquid layers, the lower being taken off from time to time and the upper being returned to the reaction vessel. 80 parts of aqueous layer was obtained which contained 30 parts of water. The solvent was then removed from the reaction vessel by distillation. The residue was purified by distillation under reduced pressure. There was obtained 71.5 parts of a product boiling at 78–88° C. at 10 mm. pressure. Analysis of this material, showing 7.40% nitrogen, confirmed that the product was $(C_2H_5OCH_2)_3N$.

Example 3

A mixture of 376 parts of dodecanol, 23.5 parts of hexamethylene tetramine, 30 parts of paraformaldehyde, and 300 parts of dry toluene was heated in the apparatus described above. The toluene together with water formed in the reaction gave a temperature at the head of the column of about 84° C. The condensate was collected in the receiver, the water separated, and the toluene returned to the reaction vessel. When the rate of formation of water appeared to be very slow, approximately after four hours, the toluene was distilled from the vessel. The residue was then heated under low pressure and a small amount of dodecanol distilled therefrom. The residue, amounting to 108 parts of a liquid, corresponded to the formula $(C_{12}H_{25}OCH_2)_3N$.

Example 4

A mixture of 240 parts of methallyl alcohol, 35 parts of hexamethylene tetramine, 45 parts of paraformaldehyde, and 200 parts of dry benzene was heated in the apparatus described above. The same general procedure was followed as already described, the vapors being condensed at B and partly returned to the column and partly run into the receiver D, where water was permitted to settle while the lighter organic liquid was returned to the flask A. Finally, the solvent and unreacted alcohol were distilled from the flask. The residue was then purified by distillation. The main fraction, collected between 120 and 177° C., amounted to 62 parts of a liquid which correspond to $(CH_2=C(CH_3)CH_2OCH_2)_3N$.

Example 5

A mixture of 28 parts of hexamethylene tetramine, 36 parts of paraformaldehyde, 250 parts of ethoxyethanol, and 250 parts of dry benzene was heated in the apparatus described above. The temperature at the head of the column was 65–70° C. Benzene and water were collected and separated essentially as described in the previous examples. When water no longer appeared to be formed, the volatile liquids were distilled from the flask and the residual product distilled between 170 and 189° C. at 7 mm. pressure. The distilled material corresponded to the composition $(C_2H_5OC_2H_4OCH_2)_3N$.

The trialphyloxymethyl amines prepared by the methods described above are soluble in organic solvents, such as benzene, toluene, dioxane, alcohols, etc. but are essentially insoluble in water. Yet they are slowly hydrolyzed by water and are more rapidly hydrolyzed by aqueous solutions of strong acids. The products are useful as insecticides, germicides, corrosion inhibitors, plasticizers, etc. Those having long chains are useful in finishing and water-proofing of textile materials.

I claim:

1. The process of preparing amines of the formula $$(ROCH_2)_3N$$

wherein R is a primary aliphatic radical selected from a member of the group consisting of aliphatic hydrocarbon radicals and aliphatic radicals which contain only carbon, hydrogen, and oxygen and in which the oxygen is connected by an ether linkage to two carbon atoms in the chain, which comprises reacting by heating hexamethylene tetramine and a primary aliphatic alcohol with a member of the group consisting of anhydrous formaldehyde and polymers of formaldehyde.

2. The process of preparing amines of the formula $$(ROCH_2)_3N$$

wherein R is a primary aliphatic radical selected from a member of the group consisting of aliphatic hydrocarbon radicals and aliphatic radicals which contain only carbon, hydrogen, and oxygen and in which the oxygen is connected by an ether linkage to two carbon atoms in the chain, which comprises heating between 50° C. and about the boiling range of butyl alcohol a mixture comprising hexamethylene tetramine, a primary aliphatic alcohol, and a member of the group consisting of anhydrous formaldehyde and polymers of formaldehyde and separating water as it forms in the reaction.

3. The process of preparing amines of the formula $$(ROCH_2)_3N$$

wherein R is a primary aliphatic radical selected from a member of the group consisting of aliphatic hydrocarbon radicals and aliphatic radicals which contain only carbon, hydrogen, and oxygen and in which the oxygen is connected by an ether linkage to two carbon atoms in the chain, which comprises reacting by heating hexamethylene tetramine and paraformaldehyde with a primary aliphatic alcohol.

4. The process of preparing amines of the formula $$(ROCH_2)_3N$$

wherein R is a primary aliphatic radical selected from a member of the group consisting of aliphatic hydrocarbon radicals and aliphatic radicals which contain only carbon, hydrogen, and oxygen and in which the oxygen is connected by an ether linkage to two carbon atoms in the chain, which comprises reacting by heating hexamethylene tetramine and paraformaldehyde with a primary aliphatic alcohol and removing the water of reaction.

5. The process of preparing amines of the formula $$(ROCH_2)_3N$$

wherein R is a primary aliphatic radical selected from a member of the group consisting of aliphatic hydrocarbon radicals and aliphatic radicals which contain only carbon, hydrogen, and oxygen and in which the oxygen is connected by an ether linkage to two carbon atoms in the chain, which comprises reacting by heating hexamethylene tetramine and anhydrous formaldehyde with a primary aliphatic alcohol and removing the water of reaction.

6. The process of preparing amines of the formula $$(ROCH_2)_3N$$

wherein R is a primary aliphatic radical selected from a member of the group consisting of aliphatic hydrocarbon radicals and aliphatic radicals which contain only carbon, hydrogen, and oxygen and in which the oxygen is connected by an ether linkage to two carbon atoms in the chain, which comprises reacting by heating in an inert solvent, hexamethylene tetramine and anhydrous formaldehyde with a primary aliphatic alcohol and separating water as it forms in the reaction.

7. The process of preparing amines of the formula $$(ROCH_2)_3N$$

wherein R is a primary aliphatic hydrocarbon radical, which comprises heating between about 50° C. and about the boiling range of butyl alcohol a mixture of hexamethylene tetramine, paraformaldehyde, a primary aliphatic alcohol, and an inert solvent and separating water as it forms in the reaction.

8. A compound of the formula $$(ROCH_2)_3N$$

wherein R is a primary aliphatic radical selected from the class consisting of aliphatic hydrocarbon radicals and aliphatic radicals, which contain only carbon, hydrogen, and oxygen and in which the oxygen is connected by an ether linkage to two carbon atoms in the chain.

9. A compound of the formula $$(C_4H_9OCH_2)_3N$$

10. A compound of the formula $$(C_{12}H_{25}OCH_2)_3N$$

LOUIS H. BOCK.